May 29, 1923.

M. G. DUSSEAU

UNIVERSAL JOINT

Filed April 29, 1920

INVENTOR
MAURICE G. DUSSEAU
BY
Hazard & Miller
ATTORNEYS.

Patented May 29, 1923.

1,457,219

UNITED STATES PATENT OFFICE.

MAURICE G. DUSSEAU, OF LOS ANGELES, CALIFORNIA, ASSIGNOR, OF ONE-TWENTIETH TO ADOLPHE DANZIGER, OF LOS ANGELES, CALIFORNIA, AND NINETEEN-TWENTIETHS TO POSITIVE TRACTION MOTORS CORPORATION.

UNIVERSAL JOINT.

Application filed April 29, 1920. Serial No. 377,652.

*To all whom it may concern:*

Be it known that I, MAURICE G. DUSSEAU, a citizen of the United States, residing at Los Angeles, in the county of Los Angeles and State of California, have invented new and useful Improvements in Universal Joints, of which the following is a specification.

This invention is a universal joint and has for its object the provision of a construction wherein the two members of the joint may be readily assembled and taken apart and which, when in assembled relation, will be positively locked against disassembly.

The invention will be readily understood from the following description of the accompanying drawings, in which Figure 1 is a side elevation, partly broken away, of a joint constructed in accordance with the invention.

Figure 1:
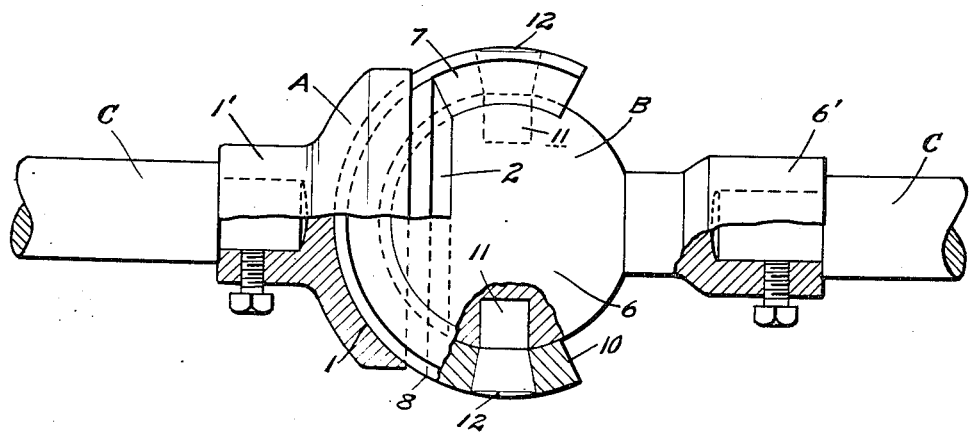
Figure 2:
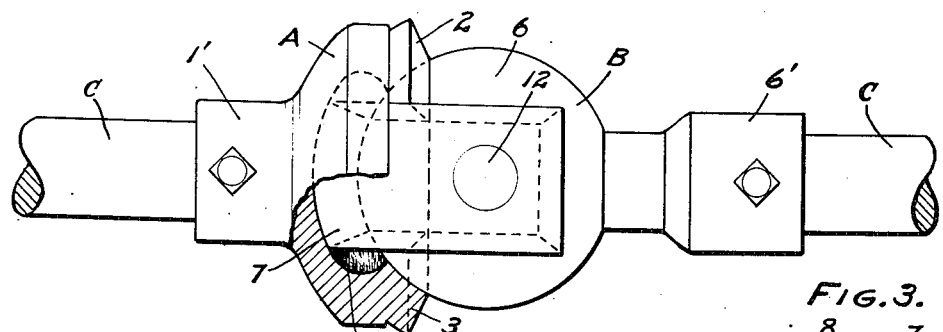
Fig. 2 is a plan view of the same also partly broken away.
Figure 5:
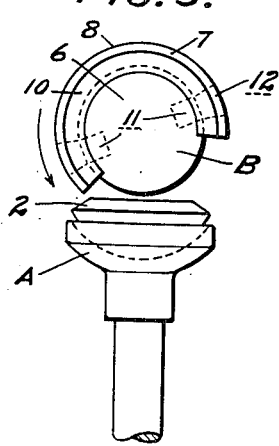
Fig. 5 is an end elevation similar to Fig. 4.

The improved universal joint comprises a concave member A and a co-operating convex member B, the two parts of the joint being shown as secured to the ends of suitable shafting C. The concave member of the joint comprises a shell having a socket 1' at one end of the shell and a concave surface 1 on said shell and at right angles to the axis of the socket 1' and shafting C. This concave surface is spherically curved so as to conform to a portion of the surface of the sphere comprising the convex member of the joint. The rim of the shell forming the concave surface is provided with inwardly projecting rims 2 and 3 arranged at opposite sides of the rim of the shell and spaced apart by the diametrically opposite guideways 4. The inner portions of these rims are curved, as shown at 5, to provide a seat for the concave member of the joint.

The convex member of the joint comprises a sphere 6 having the socket 6' projecting therefrom and arranged to engage shafting C. The sphere is arranged to be received against the curved surfaces 5 of the rims of the concave member of the joint so that the sphere may be revolved in all directions upon the seat thus formed in order to provide a universal joint between the concave and convex members.

The means for locking the sphere upon its seat comprises a rib 7 extending partially around the sphere and having its outer surface 8 curved so as to be received against the concave surface 1 of the concave member of the joint. This rim is of such width as to extend through the guideways 4 and is of a suitable length to project beyond the rims 2 and 3 when the joint is assembled. The ends of the rims 2 and 3 at the guideways 4 are under cut as shown at 9 and the sides of the rim 7 are similarly under cut as shown at 10 so that when the rim is positioned within the guideways the co-operating undercut surfaces will prevent longitudinal displacement of the members of the joint relative to one another.

The two members of the joint can only be disassembled when thus united by rotating the convex member of the joint relative to the concave member so as to slide the rim 7 lengthwise through the guideways 4. The rim 7 is pivoted to the sphere 6 at diametrically opposite points upon said sphere, so that the members of the joint may be universally shifted after the parts are assembled with the rim 7 locked within the guideways of the concave member.

The pivotal mounting for the rim 7 may comprise pins 11, preferably, provided with enlarged heads 12 for retaining the pins in position, the pins extending through the rim and into the sphere 6.

Figure 4:
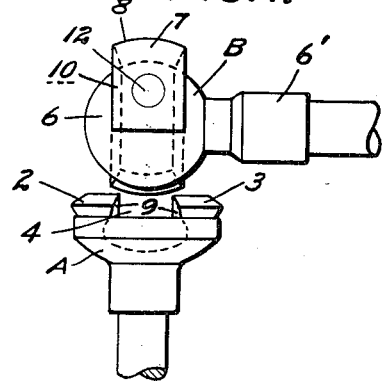
Fig. 4 is a side elevation of the members comprising the joint when taken apart and showing the relative position of the parts ready to be assembled.
Figure 3:
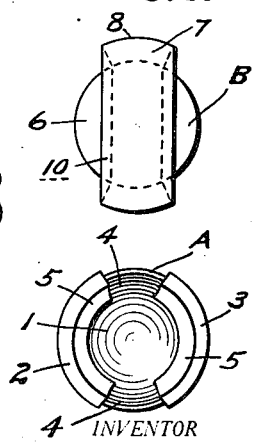
Fig. 3 is an end view of the convex and the concave members of the joint disassembled.

The parts being constructed, as above described, and it being desired to connect the two members of the universal joint, the rim 7 is turned upon the sphere 6 until the axis of the connecting socket 6' is at right angles to the circumference of the rim 7, as clearly shown in Fig. 4. When in this position the rim may be readily slid through guideways 4 by turning the sphere 6 upon the axis of the socket 6'. When the rim has been slid so as to extend entirely across the concave member of the joint and so as to extend beyond both guideways 4, the members of the joint are positively locked together, and by turning the sphere relative to the rim 7 upon the pivot pins 11 the parts are held against subsequent disassembly, since when the convex member of the joint is positioned with the axis of the socket 6' and the circumference of the rim 7 in any other position than at right angles to one another, if the convex member is rotated upon the axis of the socket 6' so as to slide rim 7 through guideways 4, the socket portion of the convex member will abut against the rim of the concave member before the rim 7 is moved relative to the concave member a sufficient distance to be disengaged from the locking connection formed by the guideways 4.

The joint, as thus assembled, forms a universal joint, the sphere 6 being turnable upon the seats 5 to extend the axis of the socket 6' in any desired direction relative to the axis of the socket 1'. When it is desired to separate the parts of the joint it is only necessary to swing the axis of socket 6' at right angles to the rim 7, and then by turning the convex member upon the axis of socket 6' the rim 7 will readily slide across the concave surface 1 and out of the guideways 4.

Various changes may be made without departing from the spirit of the invention as claimed.

What is claimed is:

1. A universal joint comprising a concave member and a spherical member arranged to seat against said concave member, and a dovetailed locking rim extending around a portion of said sphere and pivoted thereto at diametrically opposite points, said concave member having a locking guideway correspondingly dovetailed and arranged to receive said locking rim, said locking rim being slidable into said locking guideway by turning said locking rim upon said sphere until its circumference is at right angles to the axis of said spherical member of the joint and then rotating said spherical member upon said axis.

2. A universal joint comprising a concave member having retaining rims upon the rim thereof and spaced apart to form diametrically opposite guideways, the surfaces of said rims being curved to form a universal seat and a spherical member arranged to be received against said seat and having a locking rim extending around said sphere and pivoted thereto at diametrically opposite points, the edges of said locking rim and said guideways being undercut whereby said locking rim may be locked within said guideways.

3. A universal joint comprising a concave member having retaining rims upon the rim thereof and spaced apart to form diametrically opposite guideways, the surfaces of said rims being curved to form a universal seat and a spherical member arranged to be received against said seat and having a locking rim extending around said sphere and pivoted thereto at diametrically opposite points, said pivotal mounting of the locking rim being so arranged that by turning said spherical member until its axis is at right angles to the circumference of said rim, the rim may be slid into said guideway by rotation of said spherical member upon its axis, the edges of said locking rim and said guideways being undercut whereby said locking rim may be locked within said guideways.

In testimony whereof I have signed my name to this specification.

MAURICE G. DUSSEAU.